Feb. 25, 1930.  C. BOESCH  1,748,700
METHOD FOR GAINING WAX FROM HONEYCOMBS
Filed Dec. 20, 1927
Abb. 1.
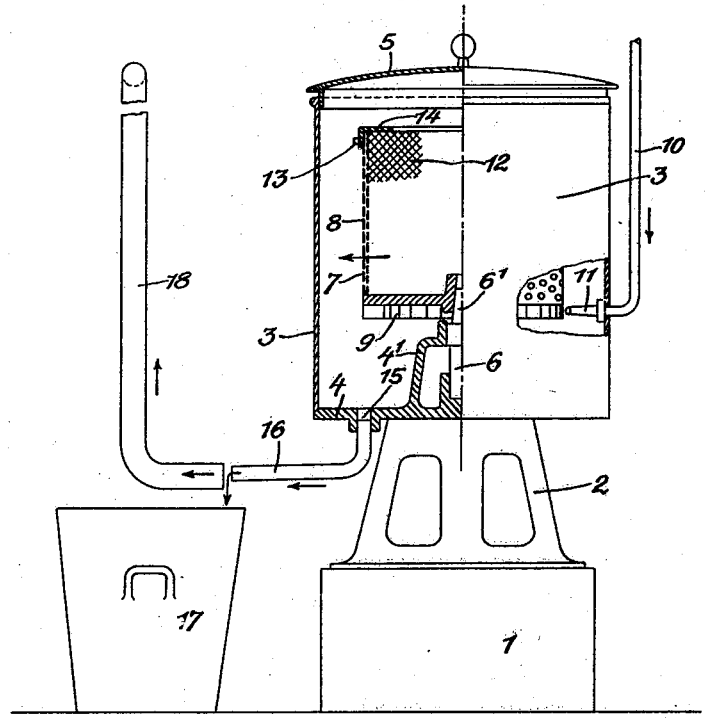
Abb. 2.
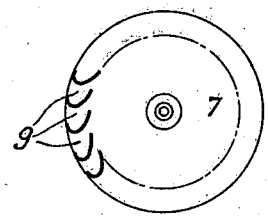
C. Boesch
INVENTOR
By: Marks & Clerk
Attys.

Patented Feb. 25, 1930

1,748,700

UNITED STATES PATENT OFFICE

CHRISTIAN BOESCH, OF MARSTETTEN, SWITZERLAND

METHOD FOR GAINING WAX FROM HONEYCOMBS

Application filed December 20, 1927, Serial No. 241,410, and in Germany March 14, 1927.

This invention relates to an improved method and apparatus for obtaining wax from honey-combs. Hitherto wax has been recovered from honey-combs by pressure, but this method has the disadvantage that the wax was not free of deleterious foreign substances and that the method was not continuous.

In contrast to this method my process consists in removing the wax from the honey combs by centrifugal force and that a centrifugal drum is driven by steam under pressure which besides its function as driving medium also is used to melt the wax.

The apparatus for carrying out any method comprises a perforated rotary drum having turbine vanes, a screen placed in this drum to retain the wax grounds, means to admit steam under pressure to the said turbine vanes, a casing enclosing the said drum and a conduit to carry away the molten pure wax, the waste water and the waste steam.

By means of my improved method and apparatus a continuous removal of wax from honey webs is possible without including foreign substances and in a considerable shorter period than by the pressure method and with a higher output.

The drawing illustrates an example of an apparatus suitable for carrying out my improved method. Fig. 1 is partly a vertical section and partly an elevation of the apparatus and Fig. 2 is a partial bottom view of the slinging drum.

1 is a base to which is fixed a pedestal 2 rigidly supporting a casing 3 with bottom 4 and removable cover 5. In a bearing $4^1$ of the bottom 4 a vertical shaft 6 is journaled. On a conical head $6^1$ of this shaft the conically bored hub of a basket or drum 7 with perforated wall 8 is placed. The bottom 4 is provided with turbine vanes 9, more clearly seen in Fig. 2, towards which a nozzle 11 is directed fitted at the end of a steam conduit 10 passing through the casing 3. A screen 12, preferably made of fine wire gauze, is removably placed on the inside of the drum 7. Studs 13 are fixed to the top of the drum 7 and a ring 14 of angular cross-section and having angular slots is engaged with the said studs and overlaps the upper edges of the drum 7 and the screen 12 to prevent slinging of the molten wax beyond the screen and the drum.

The method of removing the wax from the honey combs is as follows:

The honey combs are warmed and dissolved in water and the mass placed in the drum 7 after which the cover 5 is put on. Steam under pressure is now admitted to the nozzle and to the turbine vanes 9 whereby the drum is turned. The waste steam heats the drum 7 and maintains the wax in liquid form. This liquid wax together with the water is driven by the centrifugal force through the screen 12 and the drum 7 and the wax grounds are retained on the inside of the screen 12. The pure wax and the water is collected on the bottom 4 of the casing 3 and carried away through the outlet 15 in this bottom and the tube 16 into a vessel 17 where the wax floats on the surface of the water. The waste steam flows into a wide tube 18 and into the atmosphere. After removing the cover 5, the drum 7 may be withdrawn, without the shaft 6, $6^1$ out of the casing 3 and the wax grounds may be removed from the screen 12. Before the screen 12 can be removed the ring 14 has to be taken off the drum 7.

By using a centrifugal separation only 10 minutes are necessary while the treating of the same quantity of wax by pressure necessitates two hours.

The term centrifuging where it is used in the specification and claims means separating the foreign substances from the wax by means of the perforated wall 8 of the drum 7 and of the screen 12.

What I claim is:—

1. The method of removing wax from honey combs which comprises subjecting the honey combs to the action of centrifugal force at a temperature sufficient to melt the wax contained in the combs and screening the wax to remove foreign substances.

2. The method of removing wax from honey combs which comprises simultaneously heating and centrifuging the honey combs and screening the wax to remove foreign substances.

3. The method of removing wax from honey combs which comprises simultaneously heating and centrifuging an aqueous mixture of the honey combs, the temperature during the heating being sufficient to liquefy the wax and screening the wax to remove foreign substances.

4. The method of removing wax from honey combs which comprises simultaneously heating and centrifuging an aqueous mixture of the honey combs, the temperature during the heating being sufficient to liquefy the wax and screening the wax to remove foreign substances and then separating the wax from the water associated therewith as a result of the centrifuging.

In testimony whereof I have affixed my signature.

CHRISTIAN BOESCH.